United States Patent
Masuda

(10) Patent No.: US 9,915,308 B2
(45) Date of Patent: Mar. 13, 2018

(54) ELECTRIC BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 14/915,515

(22) PCT Filed: Aug. 29, 2014

(86) PCT No.: PCT/JP2014/072693
§ 371 (c)(1),
(2) Date: Feb. 29, 2016

(87) PCT Pub. No.: WO2015/033863
PCT Pub. Date: Mar. 12, 2015

(65) Prior Publication Data
US 2016/0208871 A1   Jul. 21, 2016

(30) Foreign Application Priority Data

Sep. 4, 2013 (JP) ................. 2013-183050

(51) Int. Cl.
B60T 13/74 (2006.01)
F16D 65/18 (2006.01)
(Continued)

(52) U.S. Cl.
CPC ............ F16D 65/18 (2013.01); B60T 13/741 (2013.01); F16D 55/225 (2013.01);
(Continued)

(58) Field of Classification Search
CPC .... F16D 65/18; F16D 55/225; F16D 2121/24; F16D 2125/40; F16D 2125/48;
(Continued)

(56) References Cited

U.S. PATENT DOCUMENTS 5,826,681 A  10/1998  Kubo et al.
6,496,768 B2  12/2002  Yamamoto
(Continued)

FOREIGN PATENT DOCUMENTS

EP  2 799 297  11/2014
EP  2 799 299  11/2014
(Continued)

OTHER PUBLICATIONS

International Search Report dated Dec. 2, 2014 in corresponding International Application PCT/JP2014/072693.
(Continued)

Primary Examiner — Thomas W Irvin

(57) ABSTRACT

An electric brake device that allows reduction of generation of an operating noise without impairing a function of a brake, is provided. The electric brake device includes a brake rotor, a brake pad, an electric motor (2), a linear motion mechanism, and a controller (9). Vehicle speed detector (44) configured to detect a vehicle speed, is provided, and the controller (9) includes: a motor angular velocity control section (40) configured to control an angular velocity of the electric motor (2); and angular-velocity-corresponding-to-vehicle-speed limiting section (41) configured to limit, in a no-load state where a clearance is between the brake pad and the brake rotor, the angular velocity by the motor angular velocity control section (40) such that the lower the vehicle speed detected by the vehicle speed detector (44) is, the lower the angular velocity of the electric motor (2) in the no-load state is.

6 Claims, 7 Drawing Sheets

(51) Int. Cl.
*F16D 55/225* (2006.01)
*F16D 121/24* (2012.01)
*F16D 125/40* (2012.01)
*F16D 125/48* (2012.01)
*F16D 125/52* (2012.01)

(52) U.S. Cl.
CPC ...... *F16D 2121/24* (2013.01); *F16D 2125/40* (2013.01); *F16D 2125/48* (2013.01); *F16D 2125/52* (2013.01)

(58) Field of Classification Search
CPC ...... F16D 2125/52; B60T 17/22; B60T 8/171; B60T 13/741
See application file for complete search history.

(56) References Cited

U.S. PATENT DOCUMENTS

| | | | |
|---|---|---|---|
| 7,516,823 | B2 | 4/2009 | Kikuchi et al. |
| 7,644,995 | B2* | 1/2010 | Haller ............... B60T 17/22 |
| | | | 303/11 |
| 7,810,616 | B2 | 10/2010 | Nakazeki |
| 8,899,695 | B2* | 12/2014 | Tanaka ............. B60T 13/745 |
| | | | 303/14 |
| 9,475,471 | B2 | 10/2016 | Yasui et al. |
| 9,518,625 | B2* | 12/2016 | Putz ................. B60T 13/065 |
| 9,616,865 | B2 | 4/2017 | Yasui et al. |
| 2002/0026272 | A1 | 2/2002 | Yamamoto |
| 2008/0110704 | A1 | 5/2008 | Nakazeki |
| 2008/0236964 | A1 | 10/2008 | Kikuchi et al. |
| 2012/0112524 | A1* | 5/2012 | Shibata ............. B60T 13/146 |
| | | | 303/10 |
| 2015/0081186 | A1 | 3/2015 | Yasui et al. |
| 2015/0151727 | A1 | 6/2015 | Yasui et al. |
| 2015/0316933 | A1 | 11/2015 | Masuda |

FOREIGN PATENT DOCUMENTS

| | | |
|---|---|---|
| JP | 6-327190 | 11/1994 |
| JP | 9-72361 | 3/1997 |
| JP | 2002-67906 | 3/2002 |
| JP | 2006-194356 | 7/2006 |
| JP | 2008-238987 | 10/2008 |
| JP | 2008-265730 | 11/2008 |
| WO | WO 2013/099850 | 7/2013 |
| WO | WO 2013/099852 | 7/2013 |
| WO | WO 2014/087813 | 6/2014 |

OTHER PUBLICATIONS

U.S. Appl. No. 14/915,523, filed Feb. 29, 2016, Yui Masuda, NTN Corporation, Osaka, Japan.
U.S. Appl. No. 15/056,411, filed Feb. 29, 2016, Yui Masuda, NTN Corporation, Osaka, Japan.
Extended European Search Report dated Apr. 7, 2017 in corresponding European Patent Application No. 14842332.0.
Chinese Office Action dated Apr. 27, 2017 in corresponding Chinese Patent Application No. 201480048396.5.
Japanese Office Action dated May 30,2017 in corresponding Japanese Patent Application No. 2013-183050.
International Preliminary Report on Patentability dated Mar. 17, 2016 in corresponding International Patent Application No. PCT/JP2014/072693.
Japanese Decision of Rejection dated Sep. 26, 2017 in related Japanese Application No. 2013-183050.
Chinese Office Action dated Nov. 24, 2017 in related Chinese Application No. 201480048396.5.

* cited by examiner

ELECTRIC BRAKE DEVICE

CROSS REFERENCE TO THE RELATED APPLICATION

This application is a U.S. National Stage Application which claims the benefit under 35 U.S.C. 371 of International Patent Application PCT/JP2014/072693, filed Aug. 29, 2014, which is based on and claims foreign priority benefit of Japanese patent application No. 2013-183050, filed Sep. 4, 2013, the entire disclosure of which is herein incorporated by reference as a part of this application.

BACKGROUND OF THE INVENTION

Field of the Invention

The present invention relates to electric brake devices that convert rotary motion of electric motors into linear motion through linear motion mechanisms, and press brake pads against disc rotors.

Description of Related Art

To date, the following brakes have been proposed as electric brakes or friction brakes.
1. An actuator that converts a rotary motion of a motor into a linear motion through a linear motion mechanism by stepping on a brake pedal, and presses a brake pad against a brake disc, thereby applying a braking force (Patent Document 1).
2. A linear actuator in which a planetary roller screw mechanism is used (Patent Document 2).
3. A hydraulic brake mechanism that maintains a pad clearance so as to be constant (Patent Document 3).

RELATED DOCUMENT

Patent Document

[Patent Document 1] JP Laid-open Patent Publication No. H06-327190
[Patent Document 2] JP Laid-open Patent Publication No. 2006-194356
[Patent Document 3] JP Laid-open Patent Publication No. H09-72361

In a case where the electric brake device described above in patent document 1 or 2 is mounted to a vehicle, comfortability in the vehicle may be impaired due to an operating noise of the electric brake device. In many cases, a principal factor of generation of a loud operating noise in the electric brake device is a noise generated in a power transmission mechanism such as a gear when a motor rotates at a high speed. At this time, in general, the faster a motor angular velocity is, the louder a generated operating noise is.

In a friction brake that operates so as to press a brake pad against a disc rotor, even when a pressing force of the brake pad has become zero, a frictional force causing a drag torque is generated due to, for example, tilting of a caliper, and deteriorates fuel or electric power efficiency of the vehicle due to the drag torque. Therefore, for example, as described above in patent document 3, a clearance is formed between the brake pad and the disc rotor during non-braking in general.

In the case of the electric brake device, when the clearance is formed, no load is applied, so that a number of rotations or a rotational speed of the motor is increased regardless of the magnitude of a required braking force in many cases. Meanwhile, when the rotational speed of the motor is limited so as to be small, a problem arises that response of the brake is delayed. In particular, in the case of the electric brake device, a speed reduction mechanism is often provided in order to generate a required braking force by a small motor, and the rotational speed of the motor needs to be increased according to a speed reduction ratio in order to prevent delay in response, so that a loud operating noise may be generated. However, in a low vehicle speed range, a comfortability in the vehicle may be impaired due to the operating noise.

SUMMARY OF THE INVENTION

An object of the present invention is to provide an electric brake device that can reduce a generation of an operating noise without impairing a function of a brake.

Hereinafter, in order to facilitate the understanding, the present invention will be described with reference to the reference numerals used in embodiments for convenience sake.

An electric brake device of the present invention comprises: a brake rotor 6; a brake pad 7; an electric motor 2; a linear motion mechanism 4 configured to convert a rotary motion of the electric motor 2 into a linear motion to transmit the linear motion to the brake pad 7; and a controller 9 configured to control the electric motor 2, and the electric brake device comprises a vehicle speed detector 44 configured to detect a vehicle speed, the controller 9 includes:

a motor angular velocity control section 40 configured to control an angular velocity of the electric motor 2; and an angular-velocity-corresponding-to-vehicle-speed limiting section 41 configured to limit the angular velocity of the electric motor 2 according to the vehicle speed detected by the vehicle speed detector 44.

For example, the vehicle speed detector 44 may calculate the vehicle speed by differentiating a rotation angle detected by, for example, a rotation angle sensor detecting a rotation angle of a wheel.

In this configuration, when a braking command value is increased and the state shifts from the non-braking state to the braking state, the controller 9 controls and drives the electric motor 2 so as to press, against the brake rotor 6, the brake pad 7 that has been in a standby state with a predetermined clearance being formed. When the braking command value is reduced and the state shifts to the non-braking state, the controller 9 controls and drives the electric motor 2 so as to separate the brake pad 7 from the brake rotor 6 and form the predetermined clearance.

When the electric motor 2 is controlled and driven, the faster a vehicle speed is, the greater the influence of the delay in response due to the above-described operation is. For example, a free running distance is increased in proportion to a vehicle speed according to the delay in response before a braking force is generated in braking. In general, the faster the vehicle speed is, the louder a background noise due to a road noise or the like is. Therefore, an upper limit value, of an operating noise, necessary for the electric brake device may not be strictly restricted.

The angular-velocity-corresponding-to-vehicle-speed limiting section 41 changes the motor angular velocity according to the vehicle speed as described below. In a no-load state where a clearance exists between the brake pad 7 and the brake rotor 6, the angular velocity of the electric motor 2 in the no-load state is limited by the motor angular velocity control section 40 such that the lower the detected vehicle speed is, the lower the angular velocity of the electric motor 2 in the no-load state is. When the angular velocity of the electric motor 2 is thus limited according to the vehicle speed, generation of an operating noise can be reduced without impairing a function of the brake. Reduction of generation of an operating noise leads to reduction of a noise in the vehicle and enhancement of comfortability in the vehicle.

The motor angular velocity control section 40 may have a PWM control section 34a configured to perform PWM control of the electric motor 2, and the angular-velocity-corresponding-to-vehicle-speed limiting section 41 may provide a command to the PWM control section 34a so as to limit a PWM duty ratio, thereby to limit the angular velocity of the electric motor 2 in a no-load state.

The PWM duty ratio represents a ratio of a pulse-on time relative to a switching cycle that is a sum of the pulse-on time and a pulse-off time. The angular-velocity-corresponding-to-vehicle-speed limiting section 41 limits a command to be provided to the PWM control section 34a. For example, the angular-velocity-corresponding-to-vehicle-speed limiting section 41 operates to a command provided to the PWM control section 34a such that the upper limit of the PWM duty ratio is limited according to the vehicle speed being reduced. Thus, the angular velocity of the electric motor 2 is limited such that the lower the vehicle speed is, the lower the voltage effective value is and the lower the angular velocity of the electric motor 2 is.

The motor angular velocity control section 40 may have a PAM control section 42 configured to perform PAM control of the electric motor 2, and the angular-velocity-corresponding-to-vehicle-speed limiting section 41 may provide a command to the PAM control section 42 so as to limit an upper limit value or a lower limit value of an amplitude of an output voltage, thereby to limit the angular velocity of the electric motor 2 in a no-load state. In this case, for example, the PAM control section 42 applies a power supply voltage to a motor coil via a step-up circuit 42a or a step-down circuit 42b, to control the electric motor 2 by control of voltage. When the step-up circuit 42a is used, the angular-velocity-corresponding-to-vehicle-speed limiting section 41 limits the upper limit value of the amplitude of the output voltage from the step-up circuit 42a. When the step-down circuit 42b is used, the angular-velocity-corresponding-to-vehicle-speed limiting section 41 limits the lower limit value of the amplitude of the output voltage from the step-down circuit 42b. Thus, the angular velocity of the electric motor 2 is limited such that the lower the vehicle speed is, the lower the angular velocity of the electric motor 2 is.

The motor angular velocity control section 40 may have a frequency control section 43 configured to control a frequency of a three-phase current to be applied to the electric motor 2, and the angular-velocity-corresponding-to-vehicle-speed limiting section 41 may provide a command to the frequency control section 43 so as to limit a frequency of the three-phase current, thereby to limit the angular velocity of the electric motor in a no-load state. In this case, for example, the frequency control section 43 sets an energization switching cycle for three phases of U, V, and W to be longer than or equal to a predetermined period, thereby to limit the angular velocity of the electric motor 2.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which the scope is to be determined by the appended claims. In the accompanying drawings, like reference numerals are used to denote like parts throughout the several views, and;

DESCRIPTION OF EMBODIMENTS

Figure 1:
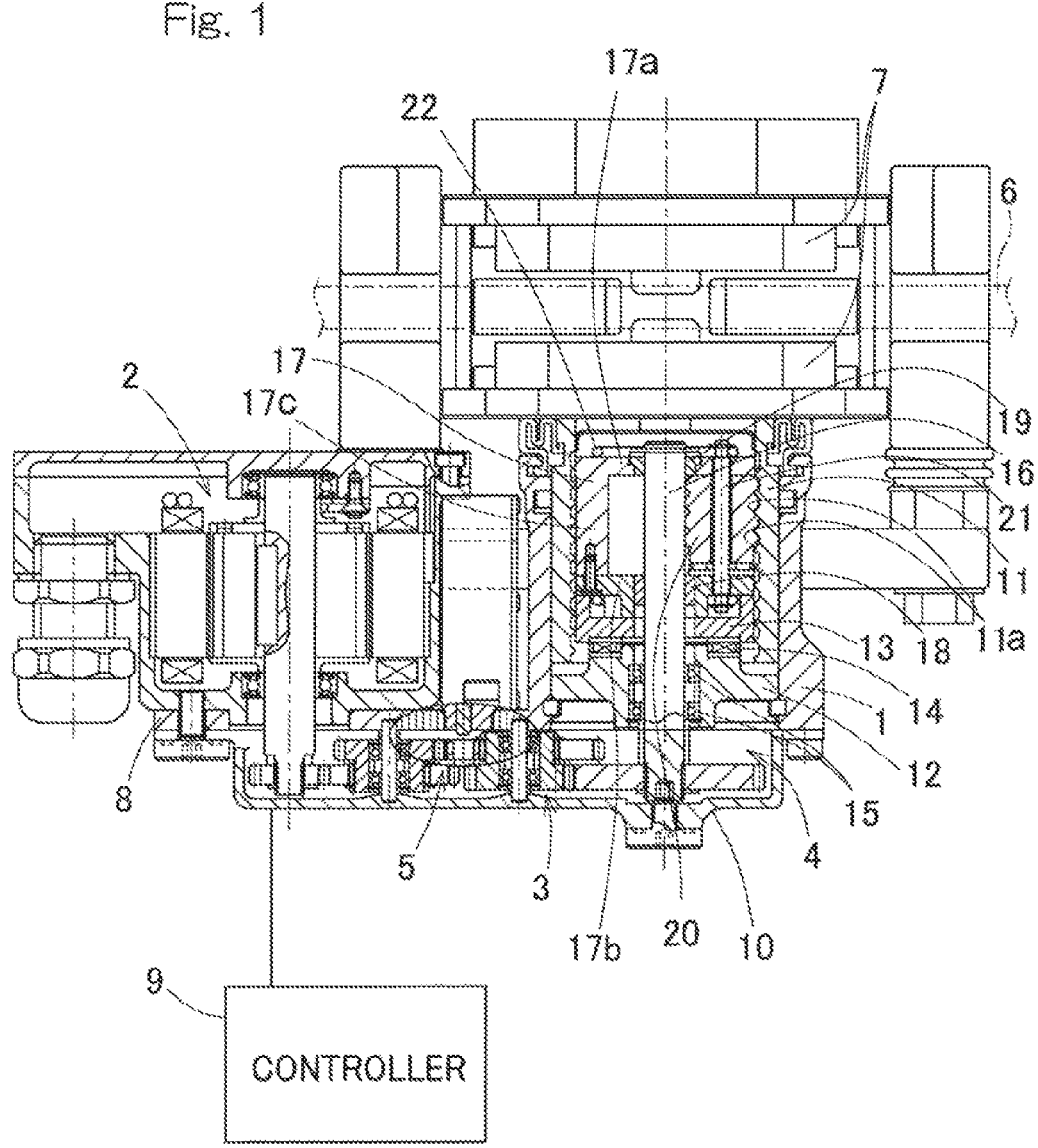
FIG. 1 is a cross-sectional view of an electric brake device according to a first embodiment of the present invention.
Figure 2:
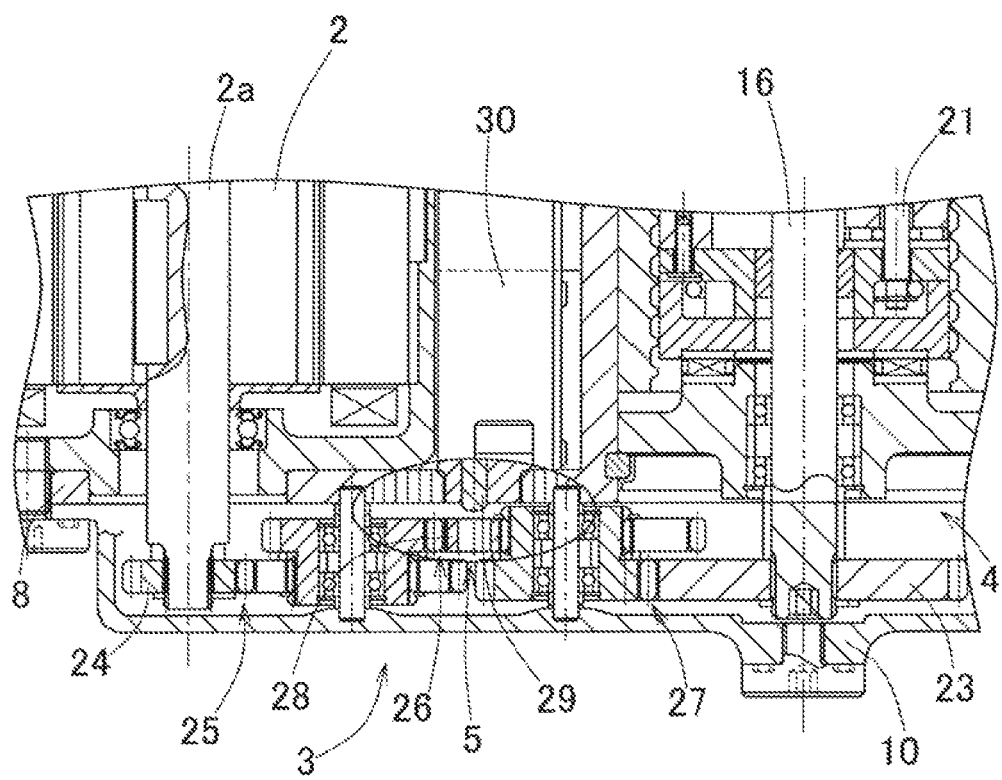
FIG. 2 is an enlarged cross-sectional view around a speed reduction mechanism of the electric brake device.
Figure 3:
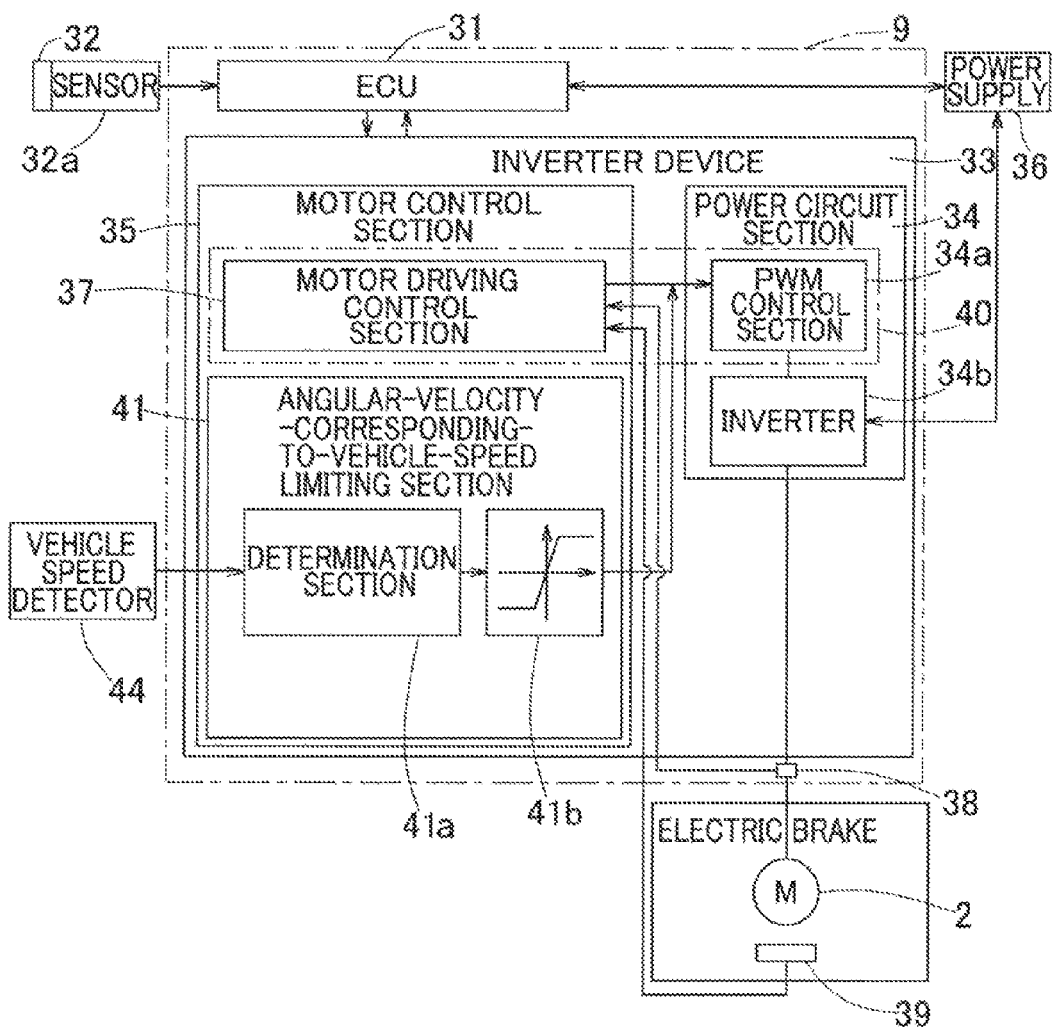
FIG. 3 is a block diagram illustrating a control system of the electric brake device.

An electric brake device according to a first embodiment of the present invention will be described with reference to FIGS. 1 to 5. As shown in FIG. 1, the electric brake device includes: a housing 1; an electric motor 2; a speed reduction mechanism 3 configured to reduce a speed of rotation of the electric motor 2; a linear motion mechanism 4; a locking mechanism 5; a brake rotor 6; a brake pad 7, and a controller 9 (FIG. 3). A base plate 8 is provided at an opening end of the housing 1 so as to extend radially outward, and the electric motor 2 is supported by the base plate 8. The linear motion mechanism 4 is incorporated into the housing 1 so as to apply a braking force to the brake rotor 6, in this example, to a disc rotor 6 by output from the electric motor 2. The opening end of the housing 1 and an outer side surface of the base plate 8 are covered by a cover 10.

The linear motion mechanism 4 will be described. The linear motion mechanism 4 is a mechanism that converts a rotary motion outputted from the speed reduction mechanism 3 into a linear motion and brings the brake pad 7 in contact with the brake rotor 6 or separates the brake pad 7 from the brake rotor 6. The linear motion mechanism 4 includes a slide member 11, a bearing member 12, an annular thrust plate 13, a thrust bearing 14, rolling bearings 15, 15, a rotation shaft 16, a carrier 17, and slide bearings 18, 19. The slide member 11 having a cylindrical shape is supported on an inner circumferential surface of the housing 1 such that the slide member 11 is prevented from rotating and is movable in the axial direction. On an inner circumferential surface of the slide member 11, a helical projection 11a is helically formed so as to project by a predetermined distance in the radially inward direction. A plurality of planetary rollers described below mesh with the helical projection 11a.

The bearing member 12 is provided at one end side, in the axial direction, of the slide member 11 in the housing 1. The bearing member 12 includes: a flange portion that extends radially outward; and a boss portion. The rolling bearings 15, 15 are fitted in the boss portion, and the rotation shaft 16 is fitted in the inner diameter surface of an inner ring of each of the bearings 15, 15. Therefore, the rotation shaft 16 is rotatably supported by the bearing member 12 through the bearings 15, 15.

The carrier 17 is provided on the inner circumference of the slide member 11 so as to be rotatable about the rotation shaft 16. The carrier 17 has disks 17a and 17b that are opposed to each other in the axial direction. The disk 17b close to the bearing member 12 may be referred to as an inner disk 17b, and the disk 17a may be referred to as an outer disk 17a. A distance adjustment member 17c is provided, in the disk 17a that is one of the disks, on the side surface opposing the disk 17b that is the other of the disks, so as to project in the axial direction from the outer circumferential edge portion of this side surface. A plurality of the distance adjustment members 17c are arranged so as to be spaced from each other in the circumferential direction such that respective distances between the plurality of planetary rollers 20 are adjusted. Both the disks 17a and 17b are integrated with each other by the distance adjustment members 17c.

The inner disk 17b is supported by the slide bearing 18 that is fitted between the inner disk 17b and the rotation shaft 16 so as to be movable in the axial direction and rotatable. The outer disk 17a has a shaft insertion hole formed at a center thereof and the slide bearing 19 is fitted into the shaft insertion hole. The outer disk 17a is rotatably supported by the slide bearing 19 about the rotation shaft 16. A washer for receiving thrust load is fitted to an end portion of the rotation shaft 16, and a retaining ring that prevents the washer from slipping off is provided.

The carrier 17 has a plurality of roller shafts 21 spaced from each other in the circumferential direction. Both end portions of each roller shaft 21 are supported by the disks 17a and 17b. That is, each of the disks 17a and 17b has a plurality of shaft insertion holes that are formed as long holes, respectively, and both end portions of each roller shaft 21 are inserted into the corresponding shaft insertion holes, whereby the roller shafts 21 are supported so as to be movable in the radial direction. An elastic ring 22 is provided around the plurality of roller shafts 21 so as to bias the roller shafts 21 in the radially inward direction.

The planetary rollers 20 are rotatably supported by the roller shafts 21, respectively, and each planetary roller 20 is disposed between an outer circumferential surface of the rotation shaft 16 and the inner circumferential surface of the slide member 11. Each planetary roller 20 is pressed against the outer circumferential surface of the rotation shaft 16 by a bias force of the elastic ring 22 provided around the plurality of roller shafts 21. By rotation of the rotation shaft 16, each planetary roller 20 that is in contact with the outer circumferential surface of the rotation shaft 16 rotates due to contact friction therebetween. On an outer circumferential surface of each planetary roller 20, a helical groove is formed so as to mesh with the helical projection 11a of the slide member 11.

A washer and a thrust bearing (both of which are not shown) are disposed between the inner disk 17b of the carrier 17 and one end portion, in the axial direction, of each planetary roller 20. In the housing 1, the annular thrust plate 13 and the thrust bearing 14 are disposed between the inner disk 17b and the bearing member 12.

The speed reduction mechanism 3 will be described. As shown in FIG. 2, the speed reduction mechanism 3 is a mechanism that reduces a speed of rotation of the electric motor 2 and transmits the reduced rotation to an output gear 23 fixed to the rotation shaft 16, and the speed reduction mechanism 3 includes a plurality of gear trains. In this example, the speed reduction mechanism 3 sequentially reduces, by gear trains 25, 26, and 27, a speed of rotation of an input gear 24 mounted to a rotor shaft 2a of the electric motor 2, and allows the rotation to be transmitted to the output gear 23 fixed to the end portion of the rotation shaft 16.

The locking mechanism 5 will be described. The locking mechanism 5 is configured to switch between: a locking state in which a braking force reducing operation of the linear motion mechanism 4 is inhibited; and an unlocking state in which the braking force reducing operation is allowed. The locking mechanism 5 is provided in the speed reduction mechanism 3. The locking mechanism 5 has: a casing (not shown); a lock pin 29; a bias means (not shown) that biases the lock pin 29 so as to be in the unlocking state; and a linear solenoid 30 that acts as an actuator for driving switching of the lock pin 29. The casing is supported by the base plate 8, and the base plate 8 has a pin hole through which the lock pin 29 is allowed to move forward and backward.

The locking state is attained when the lock pin 29 is moved forward by the linear solenoid 30, and engaged into a locking hole (not shown) formed in an intermediate gear 28 on the output side of the gear train 26, thereby to prevent rotation of the intermediate gear 28. Meanwhile, by the linear solenoid 30 being made off, the lock pin 29 is received in the casing so as to be removed from the locking hole by the bias force from the bias means, to allow rotation of the intermediate gear 28, whereby the locking mechanism 5 enters the unlocking state.

FIG. 3 is a block diagram illustrating a control system of the electric brake device. As shown in FIG. 3, a vehicle having the electric brake device mounted therein includes an ECU 31 that is an electric control unit that controls the entirety of the vehicle. The ECU 31 generates a speed reduction command according to an output, from a sensor 32a, which is changed according to an amount of an operation of a brake pedal 32. An inverter device 33 is connected to the ECU 31, and the inverter device 33 includes: a power circuit section 34 provided for each electric motor 2; and a motor control section 35 that controls the power circuit section 34.

The motor control section 35 includes a computer, a program executed by the computer, and an electronic circuit. The motor control section 35 converts, according to a speed reduction command provided from the ECU 31, the speed reduction command into a current command, and provides the current command to a PWM control section 34a of the power circuit section 34. The motor control section 35 has a function of outputting, to the ECU 31, various information such as detected values and control values concerning the electric motor 2.

The power circuit section 34 has: an inverter 34b that converts DC power from a power supply 36 into three-phase AC power used for driving the electric motor 2; and the PWM control section 34*a* that controls the inverter 34*b*. The electric motor 2 is formed as a three-phase synchronous motor or the like. The inverter 34*b* is formed by a plurality of semiconductor switching elements (not shown), and the PWM control section 34*a* performs pulse width modulation of the inputted current command to provide an on/off command to each semiconductor switching element.

The motor control section 35 has a motor driving control section 37 as its basic control section. The motor driving control section 37 converts, according to a speed reduction command as a torque command provided by the ECU 31 that is a higher-order or master control unit, the speed reduction command into the current command, and provides the current command to the PWM control section 34*a* of the power circuit section 34. The motor driving control section 37 obtains, from a current detector 38, a value of a motor current that flows from the inverter 34*b* to the electric motor 2 and performs current feedback control. Further, the motor driving control section 37 obtains a rotation angle of a rotor of the electric motor 2 from a rotation angle sensor 39, and provides a current command to the PWM control section 34*a* so as to enable efficient motor driving according to the rotor rotation angle. The current command is provided as a voltage value in this example. A motor angular velocity control section 40 that controls an angular velocity of the electric motor 2 is formed by the motor driving control section 37 and the PWM control section 34*a*.

In the present embodiment, the motor control section 35 having the above-described configuration includes angular-velocity-corresponding-to-vehicle-speed limiting section 41 described below. The angular-velocity-corresponding-to-vehicle-speed limiting section 41 limits the angular velocity of the electric motor 2 through the motor angular velocity control section 40 such that the lower the vehicle speed detected by vehicle speed detector 44 is, the lower the angular velocity of the electric motor 2 is. The angular-velocity-corresponding-to-vehicle-speed limiting section 41 limits a value of voltage applied from the motor driving control section 37 to the PWM control section 34*a*, whereby a PWM duty ratio is limited, and the angular velocity of the electric motor 2 in a no-load state is limited. The PWM duty ratio represents a ratio of a pulse-on time relative to a switching cycle that is a sum of the pulse-on time and a pulse-off time.

Figure 4:
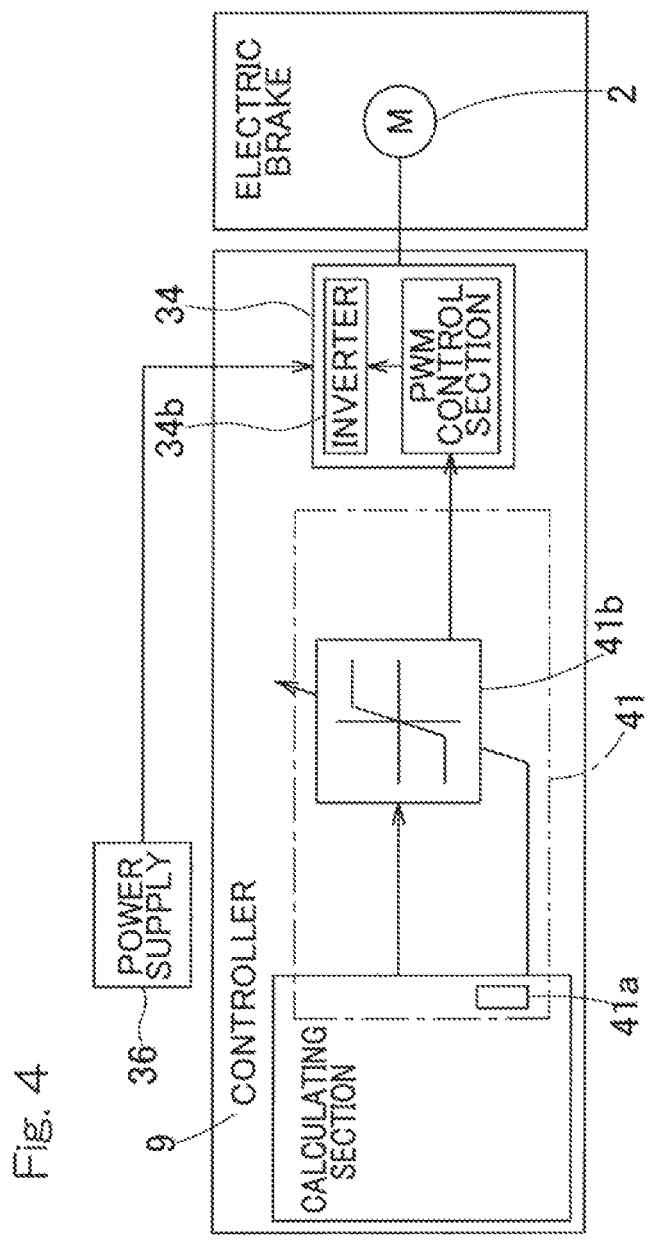
FIG. 4 is a schematic block diagram mainly illustrating a controller of the electric brake device.

FIG. 4 is a schematic block diagram mainly illustrating a controller of the electric brake device. Description will be given with reference also to FIG. 3. For example, the angular-velocity-corresponding-to-vehicle-speed limiting section 41 includes: a determination section 41*a* that determines whether or not the vehicle speed obtained from the vehicle speed detector 44 is within a defined set range; and a limiter circuit 41*b*. The set range is defined according to an actual vehicle test, simulation, or the like. A plurality of the set ranges are defined as appropriate.

The limiter circuit 41*b* can switch between an active state and a non-active state according to a signal from the outside, and normally the non-active state is set. When the determination section 41*a* determines that the vehicle speed is within the defined set range, the limiter circuit 41*b* is set so as to be in the active state, and an output voltage is limited so as to be lower than or equal to a set voltage. Thereafter, when the determination section 41*a* determines that the vehicle speed obtained from the vehicle speed detector 44 becomes zero, that is, that the vehicle has entered stop state, the limiter circuit 41*b* is restored to the non-active state. When, for example, the brake pedal is released and an accelerator pedal is stepped on while the limiter circuit 41*b* is in the active state, and the determination section 41*a* thus determines that the vehicle speed is outside the defined set range, the limiter circuit 41*b* is restored to the non-active state.

The angular-velocity-corresponding-to-vehicle-speed limiting section 41 operates so as to provide a command to the PWM control section 34*a* such that the upper limit of the PWM duty ratio is limited according to the vehicle speed being reduced. Thus, the angular velocity of the electric motor 2 is limited such that the lower the vehicle speed is, the lower the voltage effective value is and the lower the angular velocity of the electric motor 2 is.

Figure 5:
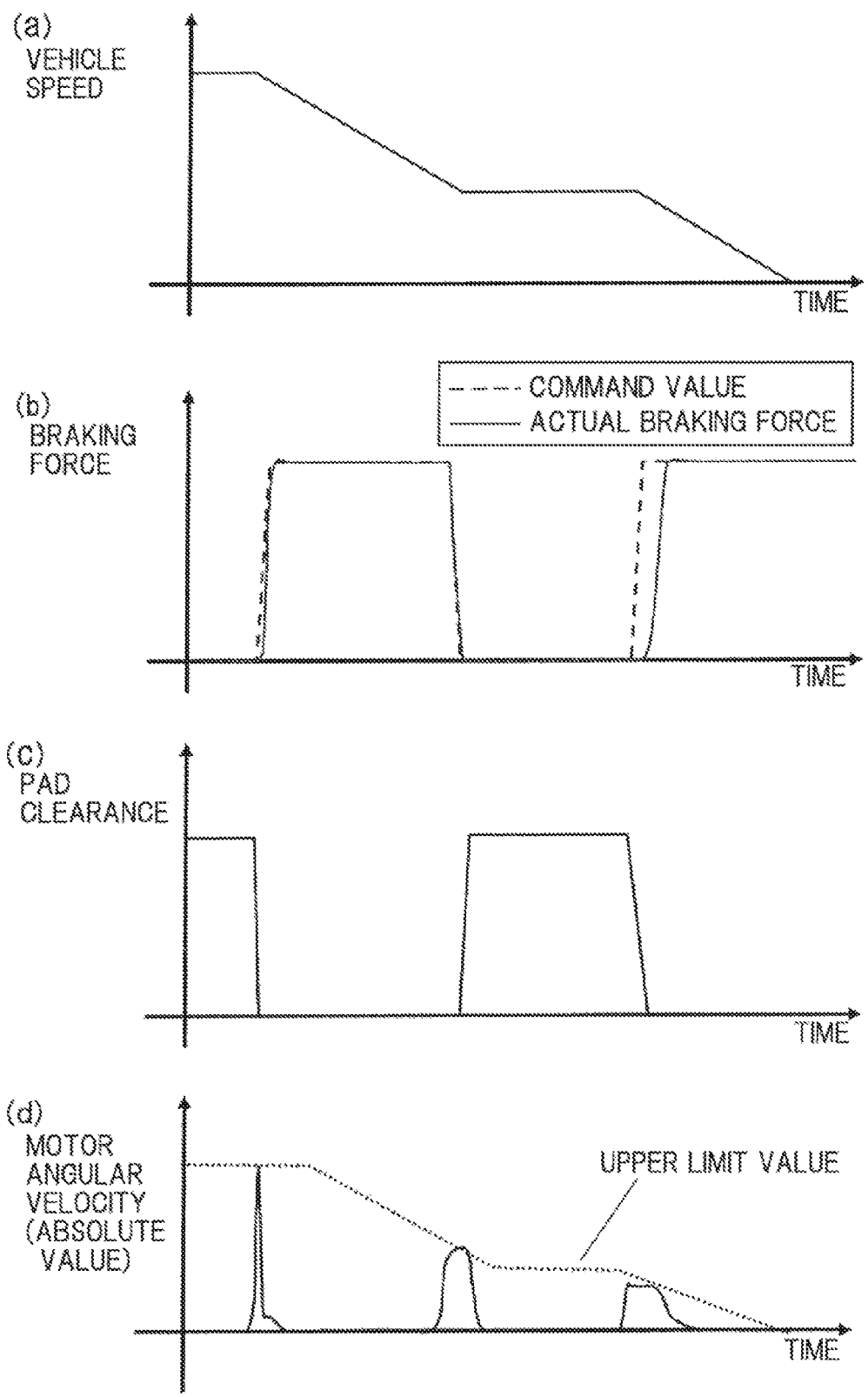
FIG. 5 is a conceptual diagram illustrating an operation of limiting a motor angular velocity in the electric brake device.

FIG. 5 is a conceptual diagram illustrating an operation of limiting the motor angular velocity in the electric brake device. FIG. 5 shows an exemplary case where the lower a traveling speed of the vehicle having the electric brake device mounted therein is (graph (a) of FIG. 5), the lower the limit value of the angular velocity of the electric motor 2 is (graph (d) of FIG. 5). Description will be given with reference also to FIG. 3. When a command value for a braking force (represented by a dotted line in graph (b) of FIG. 5) is increased and the state shifts from the non-braking state to the braking state, the controller 9 controls and drives the electric motor 2 so as to press, against the disc rotor, the brake pad that has been in a standby state with a predetermined clearance being formed. When the pad clearance is greater than or equal to zero, no braking force is generated (graphs (b) and (c) of FIG. 5). But, after a delay corresponding to a time from a timing of the input of the command value to a timing when the clearance becomes zero is generated, an actual braking force (represented by a solid line in graph (b) of FIG. 5) is exerted.

When the braking command value is reduced and the state shifts to the non-braking state, and also after the braking force has become zero, the controller 9 controls and drives the electric motor 2 so as to separate the brake pad from the disc rotor and to form the predetermined clearance. When the electric motor 2 is controlled and driven, the faster the vehicle speed is, the greater the influence of the delay in response due to the above-described operation is. For example, a free running distance is increased in proportion to the vehicle speed according to the delay in response before a braking force is generated in braking. In general, the faster the vehicle speed is, the louder a background noise due to a road noise or the like is. Therefore, an upper limit value, of an operating noise, necessary for the electric brake device may not be strictly restricted.

As described with reference to FIG. 3, the PWM control section 34*a* controls a PWM duty ratio for a time period of energization through a motor coil, according to a command provided as a voltage value from the motor driving control section 37. At this time, the upper limit value or the lower limit value of the PWM duty ratio is controlled or limited, whereby the rotational speed of the motor is limited. That is, the voltage value provided from the motor driving control section 37 to the PWM control section 34*a* is limited by the angular-velocity-corresponding-to-vehicle-speed limiting section 41. Thus, the angular velocity of the electric motor is limited such that the lower the vehicle speed is, the lower the voltage effective value is and the lower the angular velocity of the electric motor is. When the angular velocity of the electric motor 2 is thus limited according to the vehicle speed, generation of an operating noise can be reduced without impairing a function of the brake. Reduction of generation of an operating noise can lead to reduction of a noise in the vehicle and enhancement of comfortability in the vehicle.

Other embodiments will be described. In the following description, the components corresponding to the matters described in the preceding embodiment are denoted by like reference numerals, and repeated description is not given. When only a part of a configuration is described, the other part of the configuration is the same as described in the preceding description unless otherwise specified. The same operation and effect can be obtained from the same configuration. A combination of parts that are specifically described in each of the embodiments can be implemented, and, further, the embodiments may be partially combined with each other unless such combinations cause any problem.

Figure 6:
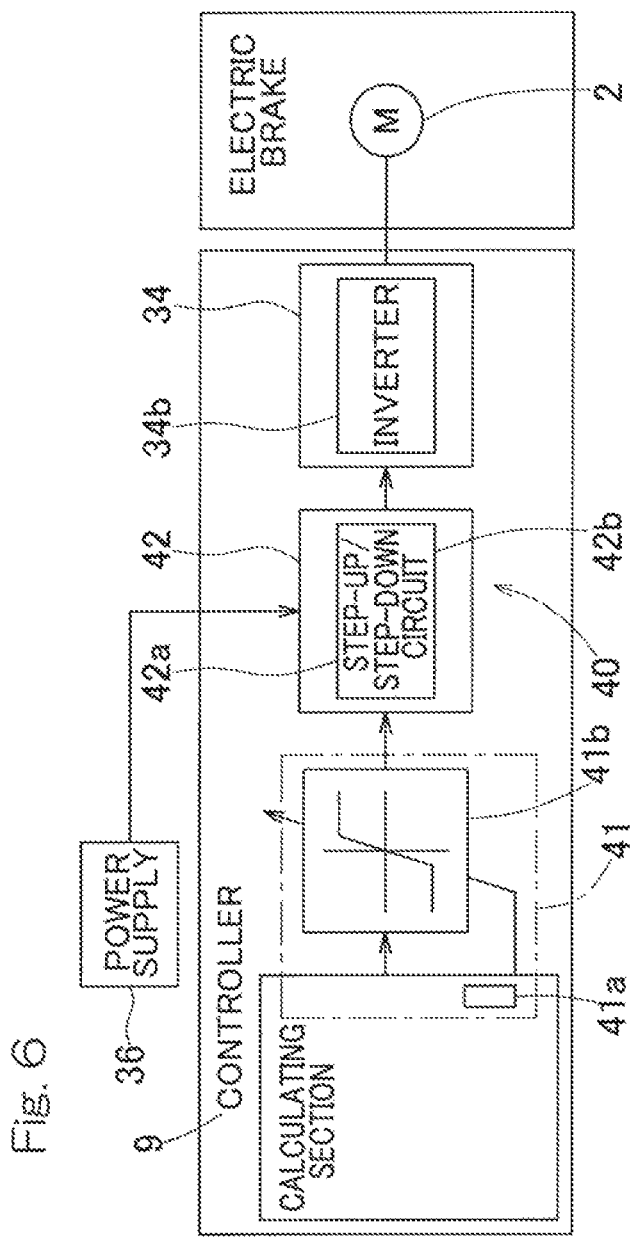
FIG. 6 is a schematic block diagram mainly illustrating a controller of an electric brake device according to another embodiment of the present invention.

FIG. 6 is a schematic block diagram mainly illustrating a controller of an electric brake device according to another embodiment. FIG. 6 illustrates an exemplary case where an angular velocity of the electric motor 2 is limited by pulse amplitude modulation (abbreviated as: PAM control). The motor angular velocity control section 40 has a PAM control section 42 that performs PAM control of the electric motor 2, and the angular-velocity-corresponding-to-vehicle-speed limiting section 41 provides a command to the PAM control section 42 so as to limit an upper limit value or a lower limit value of an amplitude of an output voltage, thereby limiting the angular velocity of the electric motor 2.

In this case, for example, the PAM control section 42 applies a power supply voltage to a motor coil via a step-up circuit 42a in the PAM control section 42, thereby to control the electric motor 2 by this control of voltage. At this time, the limiter circuit 41b of the angular-velocity-corresponding-to-vehicle-speed limiting section 41 limits the upper limit value of an amplitude of the output voltage from the step-up circuit 42a. The PAM control section 42 may be provided in the power circuit section 34, and the power supply voltage may be limited by the angular-velocity-corresponding-to-vehicle-speed limiting section 41. In a case where a step-down circuit 42b is used instead of the step-up circuit 42a, the limiter circuit 41b of the angular-velocity-corresponding-to-vehicle-speed limiting section 41 limits the lower limit value of an amplitude of the output voltage from the step-down circuit 42b.

For the step-up circuit 42a or the step-down circuit 42b, for example, a switching regulator using a switching element, a diode, a coil, and a capacitor may be used. As the switching element, for example, a transistor is used, and when the transistor is on, an electric energy is stored in the coil. And when the transistor is off, the electric energy stored in the coil is discharged. In a case where the power supply voltage is enhanced by the step-up circuit 42a, the on/off operation of the transistor is repeated according to a speed reduction command from the ECU 31 (FIG. 3), whereby an output voltage is obtained. The upper limit value of the amplitude of the output voltage from the step-up circuit 42a is limited by the limiter circuit 41b. Thus, the angular velocity of the electric motor 2 is limited such that the lower the vehicle speed is, the lower the angular velocity of the electric motor 2 is. In a case where the power supply voltage is reduced by the step-down circuit 42b, the lower limit value of the amplitude of the output voltage from the step-down circuit 42b is limited by the limiter circuit 41b. Thus, the angular velocity of the electric motor 2 is limited such that the lower the vehicle speed is, the lower the angular velocity of the electric motor 2 is.

Figure 7A:
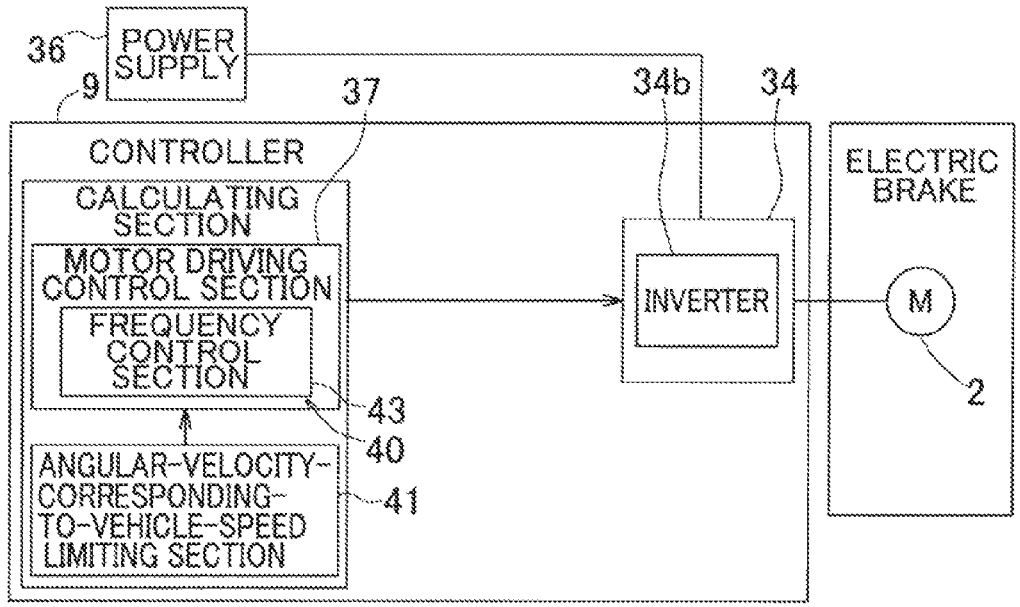
FIG. 7A is a schematic block diagram mainly illustrating a controller of an electric brake device according to still another embodiment of the present invention.
Figure 7B:
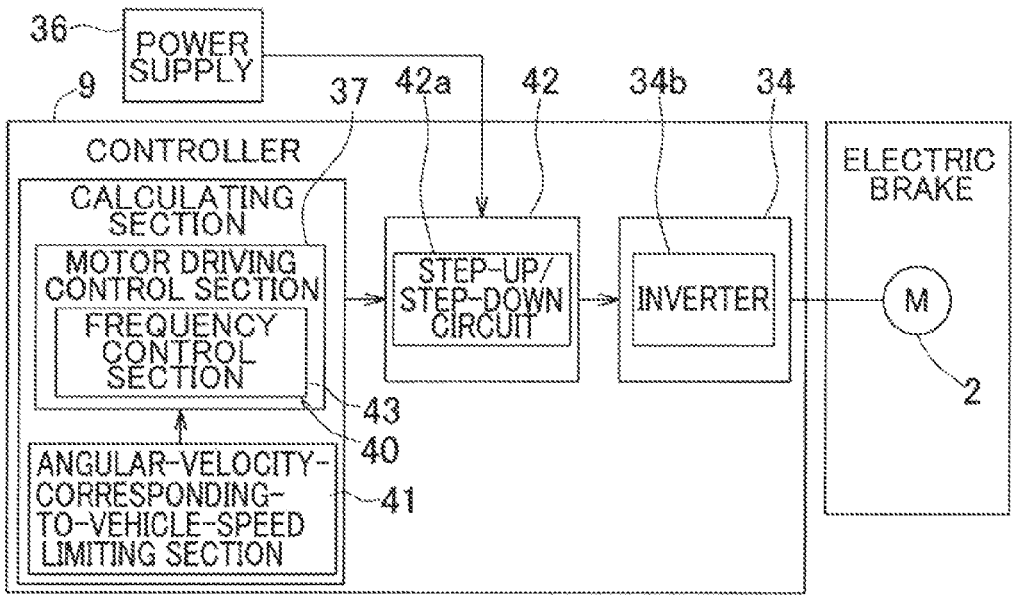
FIG. 7B is a schematic block diagram mainly illustrating a controller of an electric brake device according to a modification of still another embodiment of the present invention.

In still another embodiment, for example, in the configuration shown in FIG. 4 or FIG. 6, a brushless DC motor may be used for the electric motor 2. In this case, as shown in FIG. 7A or FIG. 7B, the motor angular velocity control section 40 has a frequency control section 43 that controls a frequency of a three-phase current to be applied to the electric motor 2, and the angular-velocity-corresponding-to-vehicle-speed limiting section 41 provides a command to the frequency control section 43 so as to limit the frequency of the three-phase current, whereby the angular velocity of the electric motor 2 is limited. In FIG. 7B, as shown in FIG. 6, the PAM control section 42 is provided, and the power supply voltage is increased or reduced by the step-up circuit 42a or the step-down circuit 42b respectively, thereby to control the electric motor 2 by this control of the voltage. In the present embodiment, a calculating section is configured such that an energization switching cycle for three phases of U, V, and W is longer than or equal to a predetermined period, instead of controlling the duty ratio or a voltage, whereby the rotational speed of the motor can be controlled. For example, in the case of a 180-degree energization method, a frequency of three-phase current is limited, and in the case of a 120-degree energization method, a switching interval for the phase can be limited so as to be longer than or equal to a predetermined time period.

In each embodiment, the electric brake device is applied to a disc brake. However, the application is not limited to the application to the disc brake only. The electric brake device may be applied to a drum brake.

Although the present invention has been fully described in connection with the preferred embodiments thereof with reference to the accompanying drawings, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope.

REFERENCE NUMERALS

2 . . . electric motor
4 . . . linear motion mechanism
6 . . . brake rotor
7 . . . brake pad
9 . . . controller
34a . . . PWM control section
40 . . . motor angular velocity control section
41 . . . angular-velocity-corresponding-to-vehicle-speed limiting section
42 . . . PAM control section
43 . . . frequency control section
44 . . . vehicle speed detector

The invention claimed is:
1. An electric brake device comprising:
a brake rotor;
a brake pad;
an electric motor;
a linear motion mechanism configured to convert a rotary motion of the electric motor into a linear motion to transmit the linear motion to the brake pad;
a controller configured to control the electric motor; and
a vehicle speed detector configured to detect a vehicle speed,
wherein the controller includes:
a motor angular velocity control section configured to control an angular velocity of the electric motor; and
an angular-velocity-corresponding-to-vehicle-speed limiting section configured to limit the angular velocity of the electric motor according to the vehicle speed detected by the vehicle speed detector, wherein the motor angular velocity control section has a PWM control section configured to perform PWM control of the electric motor, and the angular-velocity-corresponding-to-vehicle-speed limiting section provides a command to the PWM control section so as to limit a PWM duty ratio, thereby to limit the angular velocity of the electric motor in a no-load state.

2. The electric brake device as claimed in claim 1, wherein the angular-velocity-corresponding-to-vehicle-speed limiting section includes:

a determination section that determines whether or not the vehicle speed obtained from the vehicle speed detector is within a defined set range; and a limiter circuit that switches between an active state and a non-active state according to a signal from an outside, wherein the control device sets the limiter circuit from the non-active state to the active state when the determination section determines that the vehicle speed is within the defined set range, and restores the limiter circuit to the non-active state when the determination section determines that the vehicle has entered stop state.

3. The electric brake device as claimed in claim 1, wherein the motor angular velocity control section has a PAM control section configured to perform PAM control of the electric motor, and the angular-velocity-corresponding-to-vehicle-speed limiting section provides a command to the PAM control section so as to limit an upper limit value of an amplitude of an output voltage, thereby to limit the angular velocity of the electric motor in a no-load state.

4. The electric brake device as claimed in claim 1, wherein the motor angular velocity control section has a PAM control section configured to perform PAM control of the electric motor, and the angular-velocity-corresponding-to-vehicle-speed limiting section provides a command to the PAM control section so as to limit a lower limit value of an amplitude of an output voltage, thereby to limit the angular velocity of the electric motor in a no-load state.

5. The electric brake device as claimed in claim 1, wherein the motor angular velocity control section has a frequency control section configured to control a frequency of a three-phase current to be applied to the electric motor, and the angular-velocity-corresponding-to-vehicle-speed limiting section provides a command to the frequency control section so as to limit a frequency of the three-phase current, thereby to limit the angular velocity of the electric motor in a no-load state.

6. The electric brake device as claimed in claim 1, wherein the angular-velocity-corresponding-to-vehicle-speed limiting section limits the angular velocity of the electric motor such that the lower the vehicle speed detected by the vehicle speed detector is, the lower the angular velocity of the electric motor is.

* * * * *